May 30, 1961 J. BAUDE 2,986,674
REVERSE POWER SENSING DEVICE
Filed March 10, 1958 2 Sheets-Sheet 1

Inventor
John Baude
by Carl Laemmour Jr
Attorney

Inventor
John Baude

United States Patent Office 2,986,674
Patented May 30, 1961

2,986,674

REVERSE POWER SENSING DEVICE

John Baude, Milwaukee, Wis., assignor to Allis-Chalmers Manufacturing Company, Milwaukee, Wis.

Filed Mar. 10, 1958, Ser. No. 720,317

4 Claims. (Cl. 317—43)

This invention relates generally to circuit breaker control systems and in particular to a static control system which operates to open a circuit breaker and prevent the reverse flow of power through the conductors which are interconnected by the circuit breaker.

It is the accepted practice to operate electrical distribution networks in a manner so that a transformer which is not delivering power to the network will be disconnected from the network. In other words, when the network load is so distributed that the power flows from the network to the feeders on the high voltage side of the transformer, it is desired to have the transformer disconnected from the network. Another situation where disconnection is desirable occurs when the transformer is disconnected from the high voltage feeders and remains connected to the network. The losses in the transformer resulting from excitation through the secondary side of the transformer may be eliminated if the transformer is completely disconnected from the network.

Automatic switching may be accomplished by opening the breakers in the high voltage feeders on the primary side of the transformer. The resulting reversal of power, as the excitation current is supplied from the secondary winding, is sufficient to actuate the control system and open the circuit breaker connecting the secondary winding to the network. The problem becomes somewhat more complicated because reverse power sensing systems which are known in the art usually respond to a high forward current if they are sensitive to a small reverse current. To perform effectively, a reverse power sensing device must respond to a reverse power flow as small in magnitude as the excitation current of the transformer which results when the high voltage primary feeders are disconnected. However, the device must not respond to a forward power flow as great as the transformer may be able to deliver.

It is possible to build a mechanical, relay type device which will accomplish the desired result. These devices are invariably expensive, difficult to adjust and require frequent maintenance if the proper operating conditions are to be maintained. They have a limited sensitivity at low power levels if they are made unresponsive to large amounts of forward power. Conversely, if they are designed to handle extremely large amounts of forward power, without tripping the circuit breaker to disconnect the transformer, they are generally insensitive to small amounts of reverse power such as result from excitation current. Mechanical devices which overcome the problem of sensitivity are invariably complicated and extremely difficult to adjust.

To overcome the difficulties attendant a mechanical device, my invention provides a static sensing system which does away with the need for complex mechanical relays. In my device a sensing network provides a signal in phase with the system voltage and another signal in phase with the system current. A combination of these two signal voltages according to their vector sum and their vector difference produces resultant voltages which are then compared to determine the direction of power flow. The direction of power flow may be determined from the magnitudes of the vector sum of the two signal voltages as compared to the magnitude of the vector difference between the two voltages. This system of voltage comparison produces a positive voltage difference for a power flow in the forward direction and a negative voltage difference for a power flow in the other direction. Of course, the positive or negative designation given to the voltage difference is arbitrary and may be switched at will merely by a simple reversal of the output terminals of the device.

It is therefore an object of this invention to provide an improved device for sensing the direction of power flow in an alternating current system.

Another object of this invention is to provide circuit breaker control means which will operate to open the circuit breaker in response to a reverse flow of power in the system.

An additional object of this invention is to provide a static system for controlling a circuit breaker in response to a reverse flow of power on the system of which the circuit breaker is a part.

Other objects and advantages will be apparent from a consideration of the following description when read in connection with the accompanying drawings, in which.

Figure 1:
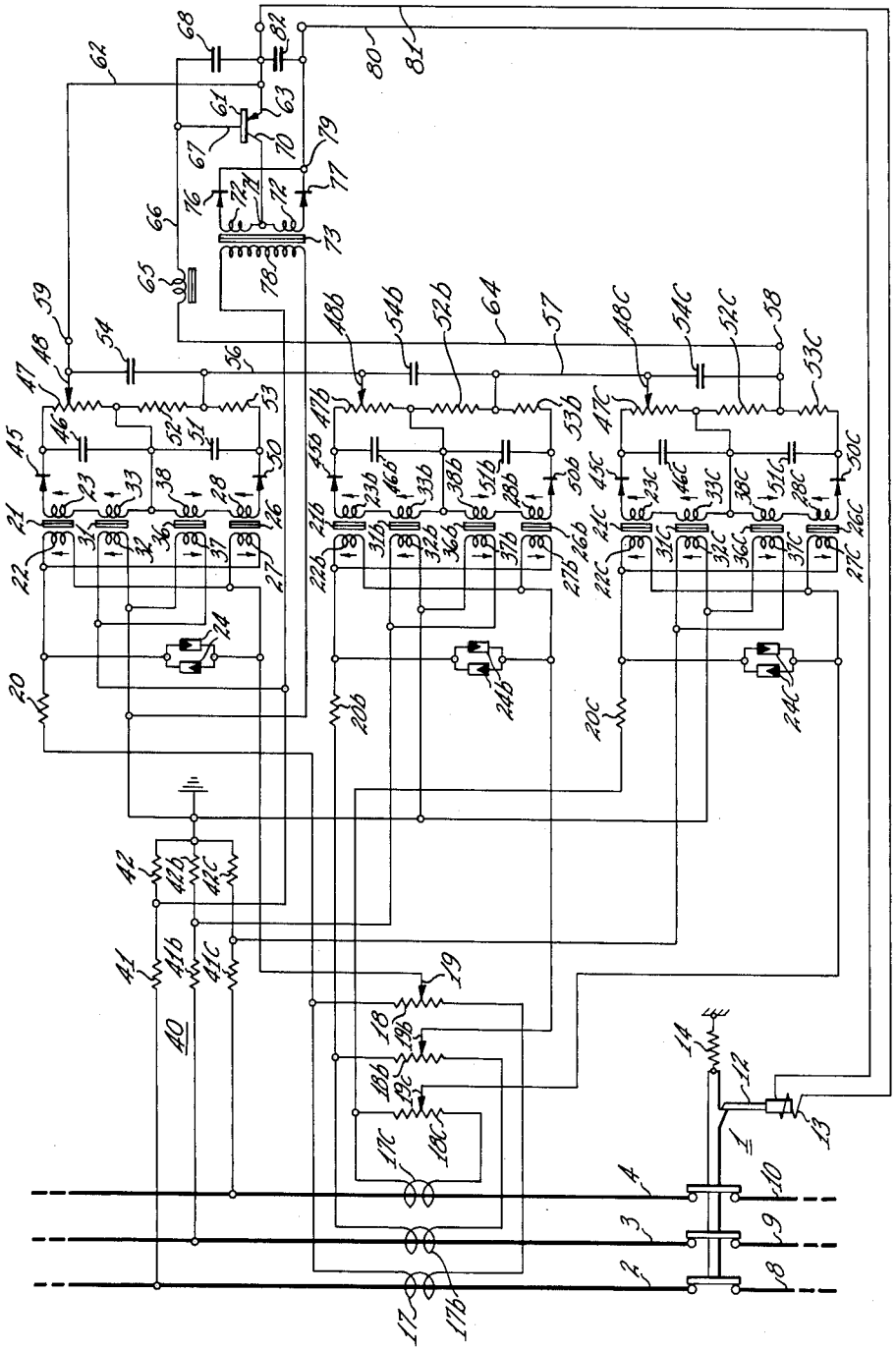
Fig. 1 is a schematic drawing of a circuit breaker control system embodying this invention.

In Fig. 1 there is shown a network circuit breaker 1 for connecting conductors 2, 3 and 4 of the three phase distribution system to a corresponding feeder circuit having conductors 8, 9 and 10. The three conductors 8, 9 and 10 are connected to the secondary winding of a step down transformer, not shown, which has its primary winding connected to high voltage feeders.

A trip mechanism for the circuit breaker is shown in schematic form as a latch mechanism having a movable catch 12 which is actuated by the trip coil 13 to allow the spring means 14 to open the breaker and disconnect conductors 2, 3 and 4 from conductors 8, 9 and 10.

The circuit breaker trip coil 13 is energized by a signal which is responsive to the direction of net power flow in the conductors and is derived by combining the outputs of three similar circuits, one for each phase.

The first of these circuits uses a current transformer 17 inductively related to conductor 2 to provide a voltage across the resistor 18 which is responsive, in phase and magnitude, to the current in conductor 2. A variable tap 19 on the resistor 18 picks off a signal voltage which is directly responsive to the current flowing in conductor 2. This signal voltage is fed through resistor 20 to the primary windings 22 and 27 of transformers 21 and 26. Varistors 24 in parallel with the primary windings 22 and 27 create a varying voltage drop across the series resistor and thereby prevent excessive current in the primary windings which would otherwise result from a large signal across the tapped portion of the resistor 18. The varistor 24 could be a double anode zener diode as well.

It is desirable to so limit the current applied to the primary windings 22 and 27 to avoid the problem of overloading any portion of the circuit. The use of miniature components is made possible by operating the control circuit at very low power levels. However, components of small size must be carefully protected against overloading due to their very limited capacity to handle overloads. This is especially true of the transformers because excessive primary current may saturate the core during a portion of the voltage cycle which leads to the generation of harmonics and other detrimental effects. For these reasons it has been found desirable to include some kind of voltage limiter in the first stages of the control scheme.

The transformers 31 and 36 having primary windings 32 and 37 are energized by the voltage appearing across a portion of the voltage divider network 40 made up of resistors 41 and 42. The voltage across resistor 42 is proportional, in phase and magnitude, to the potential of conductor 2 relative to ground. The voltage signal taken across the resistor 42 energizes the primary windings 32 and 37 of transformers 31 and 36.

It is not absolutely necessary to provide protection against overloading components in this part of the circuit, since the voltage on the system will not vary as widely as the current and the circuit may easily be designed to operate over the entire range of possible variation.

The small arrows next to the windings of transformers 21, 31, 36 and 26 indicate the polarity of each winding with respect to the other. For example, a variation in the voltage across the primary winding 22 of transformer 21 which produces a positive going voltage in the direction of the arrow will induce a positive going voltage across the secondary winding 23 as indicated by the adjacent arrow. The arrow next to the primary winding 32 of the transformer 31 points in the same direction as the arrow next to the secondary winding 33 of the same transformer, indicating that a positive going voltage in the direction of the arrow across the primary winding 32 will induce a positive going voltage across winding 33 as indicated by the adjacent arrow. The series connection of the secondary windings 23 and 33 provides the vector sum of the voltages across these windings. The voltage input to the half wave rectifier 45 will be a voltage proportional to the vector sum of a first voltage, developed across the tapped portion of resistor 18 and responsive to the system current, and a second voltage, developed across resistor 42 and responsive to the system voltage. The output of rectifier 45 is filtered by means of capacitor 46 in parallel with the load resistor 47. The direct current output of rectifier 45 produces a direct current voltage across resistor 47 which is proportional to the peak value of the vector sum of the voltages across the windings 23 and 33. A portion of this voltage is picked off by means of a variable tap 48.

Transformer 36 has a primary winding 37 so related to the secondary winding 38 that an increase in voltage across the primary winding 37 in the direction of the arrow next to this winding produces an increasing voltage in the secondary winding with a polarity as shown by the arrow next to the secondary winding 38. The fourth transformer 26 in the series circuit has its primary winding 27 and secondary winding 28 connected so that the voltages are related in polarity as shown by the arrows next to the respective windings.

Contrary to the windings 23 and 33 which energize rectifier 45 with the vector sum of the voltages across the primary windings 22 and 32, the secondary windings 28 and 38 feeding rectifier 50 are polarized to produce a vector difference between the voltage across the primary windings 27 and 37. It will be remembered at this point that the voltage across windings 22 and 27 is responsive to the system current and the voltage across windings 32 and 37 is responsive to the system voltage. This means that the input to rectifier 45 is a vector sum of the voltages responsive to system voltage and current and the input to rectifier 50 is the vector difference between the voltages responsive to system voltage and current. Rectifier 45 and rectifier 50 have capacitors 46 and 51 across their output circuits so the D.C. output voltage from the rectifiers will be essentially the peak value of the alternating current voltages across the extremities of windings 23 and 33 and the windings 28 and 38.

Resistors 52 and 53 constitute the load circuit for rectifier 50. The series resistance of resistors 52 and 53 is approximately the same as the value of resistor 47. Tapping the load of rectifier 50 at the junction of resistors 52 and 53 insures that the adjustment permitted by tap 48 will be sufficient to compensate for any unbalance in the components feeding the rectifiers. Instead of the resistors 52 and 53 a single resistor with a tap might also be used.

The direct current output voltage across the tapped portion of rectifier load resistors 47 and 52 is essentially the voltage difference between the input to rectifier 50 and rectifier 45. For example, if the output of rectifier 45 exceeds the output of rectifier 50, the potential at tap 48 will be more positive than the potential at the junction of resistors 52 and 53, assuming that the components are balanced and that the tap divides resistor 47 in the same proportion of resistor 53 to resistor 52. The balance adjustment, which is tap 48, also makes it possible to vary the response of the overall system. This feature will be discussed later.

Between tap 48 and the junction of resistors 52 and 53 is connected a capacitor 54 which charges to the value of the potential difference between the tap and the junction. This potential difference may be considered the output voltage of the sensing circuit associated with the conductor 2.

The output voltages of the sensing circuits are combined by means of a series summing circuit to produce an output voltage which is the algebraic sum of the three sensing circuit output voltages. The series summing circuit starts with tap 48 on resistor 47 and passes through the tapped portion of resistor 47 and through resistor 52 to the junction of resistors 52 and 53. The sensing circuit associated with conductor 2 is connected to the sensing circuit associated with conductor 3 by means of conductor 56 which leads from a junction of resistors 52 and 53 to the tap 48b on resistor 47b. The circuit then continues through the tapped portion of resistor 47b through resistor 52b to the junction of resistor 52b and 53b. Conductor 57 connects the circuit associated with conductor 3 to that circuit associated with conductor 4. This conductor 57 leads from the junction of resistor 52b and 53b to the tap 48c on resistor 47c. The circuit continues through the tapped portion of resistor 47c through resistor 52c to the junction of resistor 52c and resistor 53c. The combined output voltage then appears across terminals 58 and 59.

Assuming for the moment that the magnitude of each of the individual output voltages is proportional to the power flow in its respective conductor, the sum of the three output voltages will be proportional to the total power flow through the circuit represented by the three conductors. Assuming also that the polarity of the individual output voltages is responsive to the direction of power flow in its particular conductor then the polarity of the resultant output voltage will be responsive to the direction of net power flow. That is to say, that reverse power flow through any one conductor need not change the polarity of the output voltage unless the magnitude of the reverse power flow is such that it overshadows the forward power flow of the other two conductors.

The invention as shown in the drawing of this application illustrates a circuit in which the circuit breaker is responsive to the net power flow over the circuit represented by conductors 2, 3 and 4. It would be possible to produce a circuit breaker control in which a reverse power flow through any one of the three conductors would be sufficient to cause the circuit breaker to trip and disconnect the feeder systems. This could be accomplished by merely connecting three output circuits in parallel, each one energized by a separate sensing circuit, to actuate the circuit breaker trip coil.

The sensing circuit for conductor 2 which has been described above is duplicated for conductors 3 and 4. The three circuits are identical so the description of the circuit for conductor 2 may also be applied to the circuit associated with conductors 3 and 4. The components associated with the circuits for conductors 3 and 4 have been given the same reference numeral as the corresponding component for the circuit of conductor 2 except that a "b" has been added for the circuit with conductor 3 and a "c" has been added for the circuit with conductor 4.

Returning again to the summing circuit for combining the three output voltages of the sensing circuits it will be observed that capacitors 54, 54b and 54c are connected across the portion of the load circuit of the respective rectifiers. I have found that this capacitor aids greatly in providing a direct current output which is proportional to the algebraic sum of the output voltages of the respective sensing circuits.

The resultant output voltage is conducted to the emitter base circuit of transistor 61. Conductor 62 leads from terminal 59 to the emitter 63 of transistor 61. Conductor 64 leads from terminal 58 to choke 65. Conductor 66 leads from choke 65 to base 67 of transistor 61.

When the polarity of the voltage across terminals 58 and 59 is such that terminal 59 is more positive than terminal 58 the emitter of the transistor 61 will be biased positively with respect to the base 67. This bias condition prevents current from flowing through the emitter-collector circuit. A capacitor 68 is connected between the emitter 63 and base 67 to improve the control characteristics of the transistor and bypass any harmonics which may be present in the control voltage. The collector 70 of transistor 61 is connected to the center tap 71 of the secondary winding 72 of power transformer 73. The extremities of the secondary windings 72 are connected to rectifiers 76 and 77. The primary winding 78 of transformer 73 is connected to be energized by the voltage drop across resistor 42 which is a measure of the voltage on conductor 2. This is merely a convenient method of obtaining the power required to energize this transformer and could be replaced with any suitable alternating current source.

Rectifiers 76 and 77 coact to provide a direct current voltage between terminal 71 and terminal 79. Conductor 80 leads from terminal 79 to one side of trip coil 13 which energizes the circuit breaker trip mechanism. Conductor 81 leads from the other side of the trip coil to emitter 63 of the transistor 61. A capacitor 82 connected across the solenoid serves to filter the pulsating direct current output of rectifiers 76 and 77. The emitter 63 and collector 70 of transistor 61 are in series circuit with the direct current output between terminals 71 and 79 and the trip coil 13 which operates the movable catch 12 associated with circuit breaker 1. When the emitter 63 is more positive than the base 67, no current will flow between the emitter and collector. This means that the trip coil will not be energized and the circuit breaker will remain closed. When the voltage on the base of the transistor becomes more positive than the voltage of the emitter, the transistor will conduct between the emitter and collector. This allows current to flow through the trip coil and actuates the movable catch 12 causing the spring means 14 to open the circuit breaker.

Figure 2:
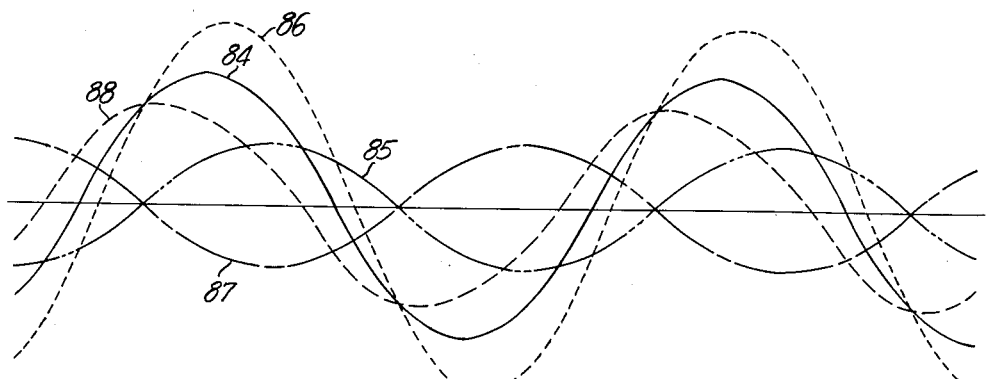
Fig. 2 is a graph illustrating the periodic variation in voltage at various points in the circuit shown in Fig. 1 for a forward power flow condition.

The operation of the circuit breaker control circuit is best explained with reference to Figs. 2 and 3. Curve 84 may be considered to represent the voltage on conductor 2 and curve 85 may be considered to represent the current through this conductor. With reference to Fig. 1, voltages responsive to these quantities would appear across resistor 42 and resistor 18, respectively. Proceeding further, the voltage across resistor 42 is applied to the primary windings 32 and 37 of transformers 31 and 36. For the purpose of simplifying the drawing, this voltage across the primary windings 32 and 37 may be considered to be represented by curve 84, Fig. 2. Again with reference to Fig. 1, the primary windings 22 and 27 of transformers 21 and 26 are energized by a voltage proportional to the voltage across resistor 18. This is the voltage appearing across resistor 18 which is tapped off by tap 19.

There is a limiting effect imposed upon this voltage by the coaction of varistor 24 or a double anode zener diode, and resistor 20. Since this effect is of consequence only during periods of extremely high current flow, we may ignore the limiting effect. Therefore, the voltage across primary winding 22 may be represented by curve 85 and the voltage across primary winding 27 may be represented by the same curve. Looking at the secondary connection of these four transformers 21, 31, 36 and 26, it will be observed that the arrows relating to secondary windings 23 and 33 are both pointing in the same direction. Since the voltages across the secondary winding are in a definite predetermined relation to the voltages across the primary windings, we may use the same curve for the voltage across the secondary windings as we use for the voltage across the primary windings. This means that curve 84 may be considered to represent the voltage across winding 33 and curve 85 may be considered to represent a voltage across winding 23. Adding these two curves graphically to obtain the vector resultant establishes the voltage across the extremities of the windings 23 and 33 which is represented by curve 86.

In the case of transformers 26 and 36, the voltage signal which appears across secondary winding 38 is of the same polarity, relative to the center tap, as the voltage across the winding 33. Thus, the voltage across winding 38 may also be represented with curve 84. The voltage across winding 28 of transformer 26 is of the opposite polarity, with respect to the center tap, from the voltage across winding 23. Curve 87 represents the voltage across winding 28. The sum of the voltages across secondary windings 28 and 38 is represented by curve 88. This voltage, represented by curve 88, is the input voltage to rectifier 50. The voltage represented by curve 86 is the input voltage to rectifier 45. It is easily seen from Fig. 2 that the output voltage of rectifier 45, which is proportional to curve 86, will be greater than the output voltage of rectifier 50, which is proportional to curve 88. This being true, the voltage developed across resistor 47 will be greater than the voltage developed across resistors 52 and 53. If the tap 48 divides resistor 47 in the same proportion as resistors 52 and 53, the tap 48 will be at a higher positive potential than the junction of resistors 52 and 53 during the condition of forward power flow in conductor 2.

Assuming that the curves represented in Fig. 2 also represent the voltage and current conditions prevailing in conductors 3 and 4, in other words, a balanced load, the sensing circuits associated with these other conductors will also provide a positive output voltage as described with reference to conductor 2. This means also that the resultant single output voltage which is the sum of all three individual output voltages will be a positive voltage. Thus, for a forward power condition, the emitter 63 of transistor 61 is maintained at a more positive voltage than the base 67. This means that the transistor will not conduct through its emitter-collector circuit and no current can flow through the solenoid which actuates the catch mechanism on the circuit breaker.

Figure 3:
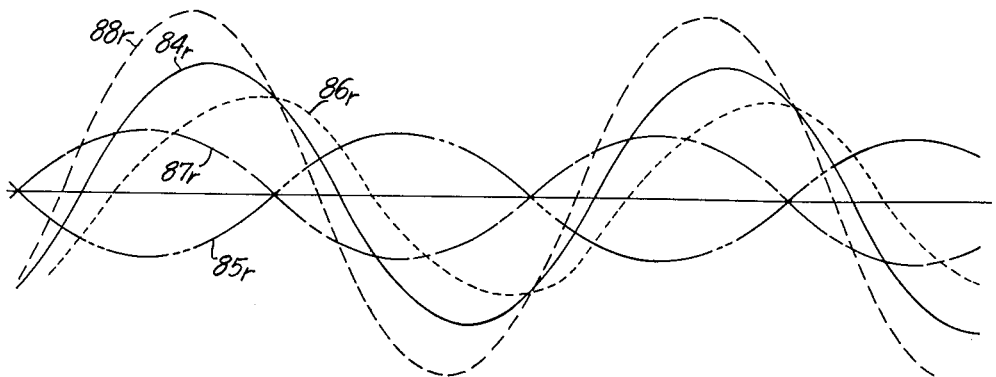
Fig. 3 is a graph illustrating a periodic variation in voltage at various points in the circuit shown in Fig. 1 for a reverse power flow condition.

Fig. 3 portrays the voltages at various points of the circuit during the condition of reverse power flow to conductors 2, 3 and 4.

Curve 84r represents the voltage on conductor 2. Curve 85r represents the current in conductor 2. It can be seen from a comparison of curve 85r and curve 85 that the phase of the current has been shifted to create a reverse power flow in conductor 2. Fig. 1 shows that primary windings 22 and 27 are energized by the voltage represented by curve 85r. Similarly, windings 32 and 37 are energized by a voltage represented by curve 84r. The secondary windings associated with transformers 21 and 31 are connected in series to provide the vector sum of the voltages across the respective windings. Therefore, the voltage input to rectifier 45 will be the vector sum of the two voltages, 84r and 85r, which is represented in Fig. 3 by curve 86r.

In the case of transformers 36 and 26, the voltage across secondary winding 38 is represented by curve 84r and the voltage across secondary winding 28 is represented by curve 87r. Since the voltage input to rectifier 50 is the vector combination of the voltages across windings 38 and 28, curve 88r represents the voltage input to the rectifier. A comparison of curve 88r, the input to rectifier 50, and curve 86r, the input to rectifier 45, shows that the input to rectifier 50 is appreciably greater than the input to rectifier 45. This means that the voltage developed across load resistors 52 and 53 will be in excess of that developed across resistor 47. It follows, therefore, that the potential of the junction between resistors 52 and 53 will be greater than the tap 48 on resistor 47 for the condition of reverse power.

If the condition of reverse power prevails in each of conductors 2, 3 and 4, the resultant output voltage between terminals 59 and 58 will be of a polarity opposed to that which prevails during the condition of forward power flow. This places the base 67 of transistor switch 61 at a positive potential relative to the emitter 63. When this condition of bias prevails the transistor conducts between emitter 63 and collector 70. When this circuit conducts, it allows current to flow through trip coil 13 pulling latch member 12 out of engagement and allowing the circuit breaker 1 to open thereby disconnecting conductors 2, 3 and 4 from conductors 8, 9 and 10. In this manner, the circuit breaker operates to disconnect one portion of the system from the other when the current or power is flowing in the reverse direction. Although transistor switch means are shown and described, it will be obvious that other static switch means, for example a magnetic amplifier, could be used as well.

Figure 4:
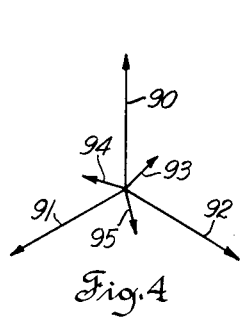
Fig. 4 is a vector diagram illustrating the relationship current and voltage in the circuit shown in Fig. 1 during the condition of forward power flow.

It is obvious that various networks will be operated in different manners so that a condition of operation might be satisfactory for one distribution system could be entirely unsatisfactory for a different distribution system. For example, it might be desirable to disconnect the system when a very slight amount of reverse power flows in one distribution system to allow remote switching of the breaker, but on the other hand, it might be undesirable to trip another system unless exceedingly large amounts of reverse power flow. To accommodate a wide variety of conditions that are to be encountered in the wide variety of distribution systems now in use, certain adjustments have been provided in my invention to allow the circuit to trip the circuit breaker at various amounts of forward or reverse power flow. Fig. 4 is a vector diagram representing the relationships of current and voltage on the three conductors. Vectors 90, 91 and 92 represent the voltage on conductors 2, 3 and 4, respectively. Vectors 93, 94 and 95 represent the current flowing in these three conductors. This vector diagram represents the same forward power flow as is portrayed in Fig. 2.

Figure 5:
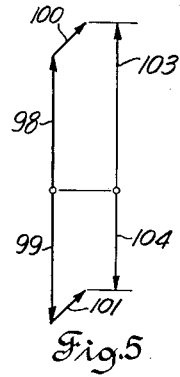
Fig. 5 is a vector diagram showing the derivation of the two output voltages present in the circuit shown in Fig. 1 during the condition of forward power.

The relationship of the voltages developed across a secondary winding of transformers 21, 31, 36 and 26 for the forward power condition is shown in Fig. 5. Vector 98, in Fig. 5, represents the voltage across secondary winding 33 of transformer 31. Vector 99 represents the voltage across secondary winding 38 of transformer 36. These two voltages represented by vectors 98 and 99 are of the same polarity with respect to the center tap of the transformer. In other words, when one increases, a corresponding increase occurs on the other side of the center tap so that the input to rectifier 45 is compensated for by a change in the input to rectifier 50. Vector 100 represents the voltage across the secondary winding 23 of transformer 21 and vector 101 represents the voltage across winding 28 of transformer 26. The peak value of the voltage across the extremities of the windings 23 and 33 is represented by arrow 103 and in a similar manner, the peak value of the voltage across the extremities of windings 28 and 38 is represented by arrow 104. For the phase relationship portrayed in Fig. 4, it will be observed that vector 100 adds to vector 98 in Fig. 5 to increase the peak value 103 but vector 101 subtracts from vector 99 to decrease peak value 104. This means that the total peak input voltage to rectifier 45 which is the vector sum of vectors 98 and 100 will exceed the peak input voltage to rectifier 50 which is the vector sum of vectors 99 and 101. The arrow 103 is proportional to the voltage output of rectifier 45 and the arrow 104 is the voltage output of rectifier 50. The capacitors 46 and 51 charge to the peak value of the voltage output of their respective rectifiers. Since the output of rectifier 45 exceeds the output of rectifier 50 during the condition of forward power flow, tap 48 is at a higher positive potential than the junction of resistors 52 and 53, biasing the emitter 63 positive with respect to the base 67 and preventing current flow between the emitter and collector. With transistor switch 61 cut off, no current flows through the trip coil 13 and conductors 8, 9 and 10.

Figure 6:
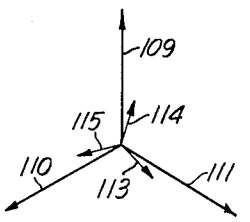
Fig. 6 is a vector diagram illustrating the relationship of the current and voltage in the circuit shown in Fig. 1 during the condition of reverse power flow.

The voltage current relationship for the reverse power flow is shown in Fig. 6. Vectors 109, 110 and 111 represent the voltage of conductors 2, 3 and 4, respectively. The current in conductors 2, 3 and 4 is represented by vectors 113, 114 and 115, respectively.

The effect of the relationship shown in Fig. 6 on the output of the sensing circuit is explained with reference to Fig. 7, which shows the voltages developed in one of the sensing circuits. The other two sensing circuits function in the same manner so they may be understood from an explanation of the circuit associated with conductor 2.

Vector 118 represents the voltage developed across the secondary windings 33 and 38 of transformers 31 and 36. The phase and magnitude of this vector are responsive to the voltage of conductor 2. The arrows associated with windings 33 and 38 to indicate polarity show that a positive going voltage across resistor 42, and therefore also primary windings 32 and 37, produces a positive going voltage across secondary windings 33 and 38 which is fed to both rectifiers.

Secondary windings 28 and 38 are polarized oppositely with respect to the current signal voltage which energizes the primary windings 22 and 27. A signal voltage which causes a positive going voltage, relative to the center tap, across winding 23, produces a negative going voltage across winding 28. In other words, a current signal which tends to increase the positive potential at the junction of rectifier 45 and winding 23 tends to reduce the positive potential at the junction of rectifier 50 and winding 28, other things remaining equal.

The reversed polarity of winding 28 is important since it allows the phase relationship between the current and voltage on a conductor to be determined. As long as vector 120, which is the voltage across winding 23, lies within the angle defined by the arc 127, the peak value of the voltage across windings 23 and 33, represented by arrow 124, will be less than the voltage across winding 23 alone.

In contrast to the situation where the peak value of the combined voltages is reduced by the current responsive signal, the windings 28 and 38 present the situation where the current signal increases the peak value of the voltage across the windings.

Vector 121, representing the voltage across the winding 28 will add to the peak value of vector 119, the voltage across winding 38, where the phase angle of vector 121 lies within the boundary of arc 128. Stating it another way, when the phase relationship of the current and voltages is such that vector 120 increases the peak value 124 of the combination of vectors 118 and 120 then the input to rectifier 45, which is represented by arrow 124, will predominate over the input to rectifier 50. This is shown in Fig. 5. Conversely, when vector 120 decreases the peak value of the sum of vectors 118 and 120 then the input to rectifier 50 will predominate over the input to rectifier 45.

Normally the current and voltage will be in the relationship shown in Figs. 4 and 5 since this represents forward power flow. In this case, the vector 100 increases the peak value 103 over the value of vector 98.

Figure 7:
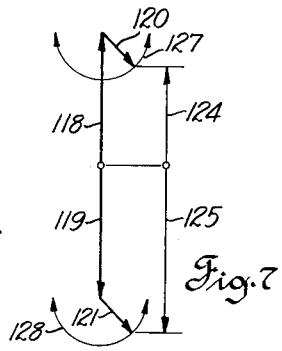
Fig. 7 is a vector diagram showing the derivation of the two output voltages present in the circuit of Fig. 1 for the reverse power flow condition.

For reverse power flow the relationship shown in Figs. 6 and 7 is typical. The current vector has shifted in phase so that it increases the peak value of arrow 125 over the peak value of vector 119.

The input to the rectifier 45 is the vector resultant of the voltages across secondary windings 23 and 33. This A.C. voltage is converted to D.C. which charges capacitor 46. The D.C. voltage across this capacitor will be essentially equal to the peak value of the A.C. input to the rectifier. The presence of the load resistor 47 across the capacitor prevents the charge from remaining at peak value. However, where the resistance is made sufficiently large, the time constant of the resistor capacitor combination is so great that the charge remains essentially at the peak value throughout the voltage cycle.

Capacitor 51, connected to be energized by the output of rectifier 50, is charged to the peak value of the A.C. voltage across secondary windings 28 and 38.

In Figs. 5 and 7, the input to the rectifiers is shown vectorially and the output is represented by the arrows 103, 104, 124 and 125. The output voltage developed by rectifier 45 across resistor 47 is represented by the arrows 103 and 124. The output voltage developed by rectifier 50 across resistors 52 and 53 is represented by the arrows 104 and 125.

Resistors 52 and 53 divided the load of rectifier 50 into a fixed ratio. The variable tap 48 on resistor 47 allows the load of rectifier 45 to be divided into a variety of ratios. Assume the ratio of resistor 52 to 53 is 3:1. When tap 48 divides resistor 47 by the same ratio and equal output voltages are produced by the rectifiers there will be no voltage output between the tap 48 and the junction of resistors 52 and 53. However, assume the same equal output voltages for the rectifiers but the tap 48 has been moved to divide resistor 47 in a 4:1 ratio. This means that a greater portion of the rectifier 45 output voltage is being compared against an unchanged portion of rectifier 50 output voltage. This situation results in a positive output voltage between the tap 48 and the junction of resistors 52 and 53 for the same power condition that existed previously. The only difference is that the transistor switch now conducts to actuate the trip coil and open the breaker.

In this manner the system can be set up to trip the circuit breaker at varying levels of forward or reverse power flow to accommodate different network operating characteristics.

While but a single embodiment of my invention has been described, other modifications will be obvious to one skilled in the art. Therefore, my invention is not to be restricted except as required by the appended claims when interpreted in view of the prior art relating thereto.

What is claimed is:

1. A power flow sensing device for an alternating current system comprising, voltage sensing means connected between a conductor of said system and the system neutral providing a first signal voltage responsive in phase to the voltage on said conductor, current sensing means electrically associated with said conductor providing a second signal voltage responsive in phase to the current in said conductor, a first pair of transformers for combining said signal voltages to produce a first alternating output voltage proportional to the vector sum of said first and second signal voltages, a second pair of transformers for combining said signal voltages to produce a second alternating output voltage proportional to the vector difference between said signal voltages, first and second rectifier means energized by said first and second alternating output voltages to produce first and second direct output voltages proportional to the peak value of the vector sum and the vector difference respectively of said signal voltages, load means energized by the first and second direct output voltages of said rectifier means, tap means on said load means for picking off the voltage difference between said first and second direct output voltages, said voltage difference being responsive to the direction of power flow through said conductor.

2. In an alternating current distribution system having a source of power connected to a load circuit through a circuit breaker by means of a plurality of conductors, a circuit breaker trip control comprising, a current transformer coupled to one of said conductors, said transformer providing a first signal voltage responsive to the phase of the current flowing in the conductor with which it is associated, voltage sensing means connected between said one conductor and the system neutral, said voltage sensing means providing a second signal voltage responsive to the phase of the voltage between said conductor and said neutral, a first pair of transformers having primary and secondary windings, means connecting said primary windings to be energized by said first signal voltage, a second pair of transformers having primary and secondary windings, means connecting the primary windings of said second pair of transformers to be energized by said second signal voltage, means connecting the secondary windings of said pairs of transformers to produce a first output voltage proportional to the vector sum of said signal voltages and a second output voltage proportional to the vector difference of said signal voltages, rectifier means connected to said secondary windings to convert said first and second output voltages to a first direct voltage proportional to the peak value of said first output voltage and a second direct voltage proportional to the peak value of said second output voltage, load means energized by said first and second direct output voltages, tap means on said load means for picking off the voltage difference between said first and second direct output voltages, trip means for opening said breaker, means connecting said trip means to be responsive to a predetermined difference between said first and second direct output voltages, said predetermined difference indicating a predetermined power flow to said load circuit.

3. In an alternating current distribution system having a source of power connected to a load circuit through a circuit breaker by means of a plurality of conductors, a circuit breaker trip control comprising, a current transformer coupled to one of said conductors, said transformer providing a first signal voltage responsive to the phase of the current flowing in said one conductor, voltage sensing means connected between said one conductor and the neutral of the system for providing a second signal voltage responsive to the phase of the voltage between said one conductor and the system neutral, a first pair of transformers having primary and secondary windings, means connecting said primary windings to be energized by said first signal voltage, a second pair of transformers having primary and secondary windings, means connecting the primary windings of said second pair of transformers to be energized by said second signal voltage, means connecting the secondary windings of said pairs of transformers to produce a first output voltage proportional to the vector sum of said signal voltages and a second output voltage proportional to the vector difference of said signal voltages, rectifier means connected to said secondary windings to convert said first and second output vloltages to a first direct voltage proportional to said first output voltage and a second direct voltage proportional to said second output voltage, load means energized by said first and second direct output voltages, tap means on said load means for picking off the voltage difference between said first and second direct output voltages, capacitor means connected across said load means, trip means for opening said breaker, a power source, switch means responsive to the voltage picked off by said tap means for connecting said power source to said trip means to open said breaker.

4. In an alternating current distribution system having a source of power connected to a load circuit through a circuit breaker by means of a plurality of conductors, a circuit breaker trip control comprising, a current transformer coupled to one of said conductors, said transformer providing a first signal voltage responsive to the phase of the current flowing in said one conductor, voltage sensing means connected between said one conductor and the neutral of the system for providing a second signal voltage responsive to the phase of the voltage between said one conductor and the system neutral, a first pair of transformers having primary and secondary windings, means connecting said primary windings to be energized by said first signal voltage, a second pair of transformers having primary and secondary windings, means connecting the primary windings of said second pair of transformers to be energized by said second signal voltage, means connecting the secondary windings of said pairs of transformers to produce a first output voltage proportional to the vector sum of said signal voltages and a second output voltage proportional to the vector difference of said signal voltages, rectifier means connected to said secondary windings to convert said first and second output voltages to a first direct voltage proportional to said first output voltage and a second direct voltage proportional to said second output voltage, load means energized by said first and second direct output voltages, tap means on said load means for picking off the voltage difference between said first and second direct output voltages, capacitor means connected across said load means, trip means for said circuit breaker, semiconductor switch means, a second power source, circuit means connecting said trip means to said second power source, means connecting said semiconductor switch means to control the flow of power from said second power source to said trip means, means connecting said semi-conductor switch means to be controlled by said voltage difference picked off by said tap means to trip said circuit breaker in response to a predetermined power flow on said system.

References Cited in the file of this patent

UNITED STATES PATENTS

| | | |
|---|---|---|
| 1,931,069 | Fitzgerald | Oct. 17, 1933 |
| 2,201,829 | Heinrich | May 21, 1940 |
| 2,454,807 | Kennedy | Nov. 30, 1948 |
| 2,524,515 | Chapman | Oct. 3, 1950 |
| 2,529,723 | Chevallier | Nov. 14, 1950 |